(12) United States Patent
Van Hoek

(10) Patent No.: US 10,076,930 B2
(45) Date of Patent: Sep. 18, 2018

(54) BICYCLE HUB FOR A BICYCLE TRANSMISSION SYSTEM

(71) Applicant: Robertus Cornelius Wilhelmus Van Hoek, Vlijmen (NL)

(72) Inventor: Robertus Cornelius Wilhelmus Van Hoek, Vlijmen (NL)

( * ) Notice: Subject to any disclaimer, the term of this patent is extended or adjusted under 35 U.S.C. 154(b) by 308 days.

(21) Appl. No.: 14/898,308

(22) PCT Filed: Jun. 16, 2014

(86) PCT No.: PCT/NL2014/050393
§ 371 (c)(1),
(2) Date: Dec. 14, 2015

(87) PCT Pub. No.: WO2014/200352
PCT Pub. Date: Dec. 18, 2014

(65) Prior Publication Data
US 2016/0129727 A1 May 12, 2016

(30) Foreign Application Priority Data

Jun. 14, 2013 (NL) ...................................... 2010969

(51) Int. Cl.
*B60B 27/04* (2006.01)
*B62M 9/12* (2006.01)
*B60B 27/02* (2006.01)

(52) U.S. Cl.
CPC ............ *B60B 27/04* (2013.01); *B60B 27/023* (2013.01); *B62M 9/12* (2013.01)

(58) Field of Classification Search
CPC ...... B60K 17/043; B60K 17/06; B60K 17/08; B60B 27/00; B60B 27/0021; B60B 27/0026; B60B 27/04; B60B 27/047; B60B 27/023; F16D 41/00; F16D 41/24; F16D 41/30; F01D 5/026
See application file for complete search history.

(56) References Cited

U.S. PATENT DOCUMENTS

| | | | |
|---|---|---|---|
| 8,096,623 B2 * | 1/2012 | You .......................... | B60B 27/04 192/64 |
| 9,649,880 B2 * | 5/2017 | Fujita .................. | B60B 27/0026 |
| 9,731,550 B2 * | 8/2017 | Koshiyama ............ | B60B 27/04 |
| 2010/0254752 A1 | 10/2010 | Shook | |
| 2011/0193406 A1 | 8/2011 | Chiang | |

OTHER PUBLICATIONS

International Search Report, dated Sep. 26, 2014, from corresponding PCT application.

* cited by examiner

*Primary Examiner* — Jason R Bellinger
(74) *Attorney, Agent, or Firm* — Young & Thompson

(57) ABSTRACT

A bicycle hub 1 includes a hollow cylindrical body 3 which is provided with external splines having teeth 5 extending in axial direction. Each tooth has a first axial side 7 which is loaded during use by a sprocket wheel slid onto the body and an opposite, second axial side 9. Three of the teeth are composed of two portions, that is to say a first portion 11 which forms a whole with the body and a second portion which forms an insert 13. The insert partly forms the first side 7 of the tooth. The body is provided with three axial grooves 15 which accommodate the inserts 13. The inserts 13 partly protrude above the grooves and the height 17 of the inserts is approximately equal to the width 19 of the inserts.

20 Claims, 1 Drawing Sheet

BICYCLE HUB FOR A BICYCLE TRANSMISSION SYSTEM

FIELD OF THE INVENTION

The invention relates to a bicycle hub for a bicycle transmission system comprising a hollow cylindrical body which has external splines with teeth extending in axial direction, which teeth have each a first axial side which is loaded during use by a sprocket wheel slid onto the body and an opposite, second axial side, of which teeth at least one tooth comprises two portions, that is to say a first portion which forms a whole with the body and a second portion which forms an insert, where the insert at least partially forms the first side and the first portion forms the second side, where the body is provided with at least one axial groove and the insert is accommodated in the groove and partially protrudes above the groove.

STATE OF THE ART

A bicycle hub of this type is known from US 2011/0193406 A. In this document the insert is formed by a planar strip which is accommodated on the body and is provided with a recess which fits around the first portion and a trotruding portion which is accommodated in the groove provided in the body. This insert rests only over part of its length against the body and the first portion of the tooth. In addition, this part does not rest against the body and the first portion of the tooth over the entire height of the insert. As a result, during use relatively large compressive stresses srise in the contact surfaces between the insert and the body and the first portion of the tooth.

SUMMARY OF THE INVENTION

It is an object of the invention to provide a bicycle hub of the type defined in the opening paragraph where the insert can transfer large forces and resist large stresses. For this purpose the bicycle hub in accordance with the invention is characterized in that the insert is formed by a rectangular block of which at either one of the two ends two oppositely located ribs have a rounded shape, and the insert is accommodated in the groove over the entire insert length and is in contact with a sidewall of the groove as well as a sidewall of the first portion of the tooth, where the top of the insert is flush with the top of the first portion of the tooth. A rectangular block having rounded ribs at the ends forms a robust element which car resist large forces and stresses. Since the top of the insert is flush with the top of the first portion of the tooth, the insert is supported over its entire height and length by the body and the first portion of the tooth. As a result, large forces can be transferred better to the body and fewer peak stresses will arise than with the known insert. The end faces preferably have a curved shape, for example like the shape of a semicircular cylinder.

The height of the insert is preferably equal to the width of the insert. An insert having this shape is stronger than a planar strip-shaped insert.

An embodiment of the bicycle hub in accordance with the invention is characterized in that the groove is bounded in axial direction by axial bounding walls between which the insert is enclosed in axial direction. This provides a sound axial locking of the insert as a result.

The insert and the groove preferably have rounded ends, so that there are fewer places where dirt can accumulate.

A further embodiment of the bicycle hub in accordance with the invention is characterized in that the groove and the insert extend over only part of the length of the tooth. Since a bicycle hub does not only accommodate loose sprocket wheels but also a plurality of sprocket wheels assembled to a relatively wide sprocket cassette, the teeth of the body will not locally be loaded heavily by this wide cassette. The load will be spread over a larger surface as a result of which the teeth of the body need not be reinforced in the place of this cassette and thus the body will not be weakened by the grooves.

To avoid the inserts inadvertently dropping out of the grooves, the insert is preferably force-fitted in the groove with a slight force-fit.

BRIEF DESCRIPTION OF THE DRAWINGS

The following description relating to the appended drawings, the whole given by way of non-limiting example of the bicycle hub according to the invention, will provide better understanding of how the invention can be realized, in which.

DETAILED DESCRIPTION OF THE DRAWINGS

Figure 1:
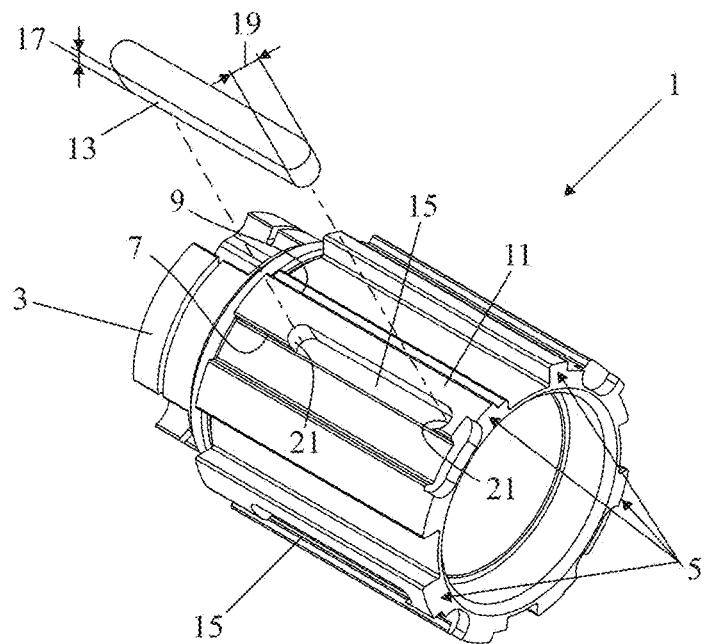
FIG. 1 shows a perspective view of an embodiment of the bicycle hub in accordance with the invention.

FIG. 1 shows a perspective view of an embodiment of the bicycle hub 1 in accordance with the invention. The bicycle hub comprises a hollow cylindrical body 3 which is provided with external splines having teeth 5 extending in axial direction. Each tooth has a first axial side 7 which during use is loaded by a sprocket wheel slid onto the body and an opposite, second axial side 9.

Three of the teeth are composed of two portions, that is to say, a first portion 11 which forms a whole with the body and a second portion which forms an insert 13. The insert partly forms the first side 7 of the tooth and the first portion 11 forms the second side 9 of the tooth and the remaining part of the first side 7.

The body is provided with three axial grooves 15 in which the inserts 13 are force-fitted with a slight force-fit. The inserts 13 partly protrude above the grooves and the height 17 of the inserts is approximately equal to the width 19 of the inserts.

The grooves 15 in the body are bounded in axial direction by axial bounding walls 21 between which the inserts 13 vare enclosed in axial direction. The inserts and the grooves have a rounded shape at the ends and extend only over part of the length of the teeth.

Figures 2, 3:
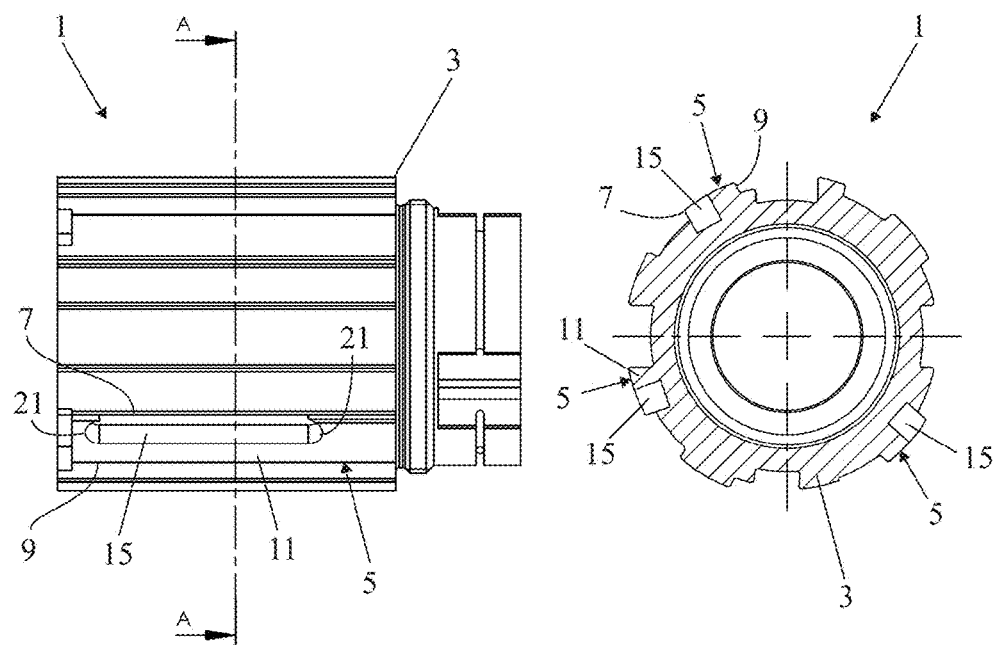
FIG. 2 shows a side view of the bicycle hub shown in FIG. 1.
FIG. 3 shows a sectional view of the bicycle hub along line A-A shown in FIG. 2.

For illustrative purposes FIG. 2 shows a side view of the bicycle hub and FIG. 3 shows a sectional view of the bicycle hub along the line A-A shown in FIG. 2.

Although the invention has been described in the foregoing based on the drawings, it should be observed that the invention is not by any manner or means restricted to the embodiment shown in the drawings. The invention also extends to all embodiments deviating from the embodiment shown in the drawings within the scope defined by the claims.

The invention claimed is:

1. A bicycle hub (1) for a bicycle transmission system comprising a hollow cylindrical body (3) which has external splines with teeth (5) extending in an axial direction, said teeth each having a first axial side (7) which is loaded during use by a sprocket wheel slid onto the body and an opposite, second axial side (9), at least one of said teeth comprising a first portion (11) which is formed integrally with the body and a second portion which forms an insert (13), where the insert at least partially forms the first side (7) and the first portion (11) forms the second side (9), where the body (3) is provided with at least one axial groove (15) and the insert (13) is accommodated in the groove and partially protrudes above the groove, wherein the insert (13) is formed by a rectangular block comprising two oppositely located ends each having a rounded shape, and the insert is accommodated in the groove over the entire insert length and is in contact with a sidewall of the groove as well as a sidewall of the first portion of the tooth, and wherein the top of the insert is flush with the top of the first portion of the tooth.

2. A bicycle hub (1) as claimed in claim 1, wherein the height (17) of the insert (13) is approximately equal to the width (19) of the insert (13).

3. A bicycle hub (1) as claimed in claim 1, wherein the groove (15) is bounded in axial direction by axial bounding walls (21) between which the insert (13) is enclosed in axial direction.

4. A bicycle hub (1) as claimed in claim 1, wherein the insert (13) and the groove (15) have rounded ends.

5. A bicycle hub (1) as claimed in claim 1, wherein the groove (15) and the insert (13) extend over only part of the length of the tooth (5).

6. A bicycle hub (1) as claimed in claim 1, wherein the insert (13) is force-fitted in the groove (15).

7. A bicycle hub (1) as claimed in claim 2, wherein the groove (15) is bounded in axial direction by axial bounding walls (21) between which the insert (13) is enclosed in axial direction.

8. A bicycle hub (1) as claimed in claim 2, wherein the insert (13) and the groove (15) have rounded ends.

9. A bicycle hub (1) as claimed in claim 3, wherein the insert (13) and the groove (15) have rounded ends.

10. A bicycle hub (1) as claimed in claim 2, wherein the groove (15) and the insert (13) extend over only part of the length of the tooth (5).

11. A bicycle hub (1) as claimed in claim 3, wherein the groove (15) and the insert (13) extend over only part of the length of the tooth (5).

12. A bicycle hub (1) as claimed in claim 4, wherein the groove (15) and the insert (13) extend over only part of the length of the tooth (5).

13. A bicycle hub (1) as claimed in claim 2, wherein the insert (13) is force-fitted in the groove (15).

14. A bicycle hub (1) as claimed in claim 3, wherein the insert (13) is force-fitted in the groove (15).

15. A bicycle hub (1) as claimed in claim 4, wherein the insert (13) is force-fitted in the groove (15).

16. A bicycle hub (1) as claimed in claim 5, wherein the insert (13) is force-fitted in the groove (15).

17. A bicycle hub (1) as claimed in claim 7, wherein the insert (13) and the groove (15) have rounded ends.

18. A bicycle hub (1) as claimed in claim 7, wherein the groove (15) and the insert (13) extend over only part of the length of the tooth (5).

19. A bicycle hub (1) as claimed in claim 8, wherein the groove (15) and the insert (13) extend over only part of the length of the tooth (5).

20. A bicycle hub (1) as claimed in claim 9, wherein the groove (15) and the insert (13) extend over only part of the length of the tooth (5).

* * * * *